Figure 1:
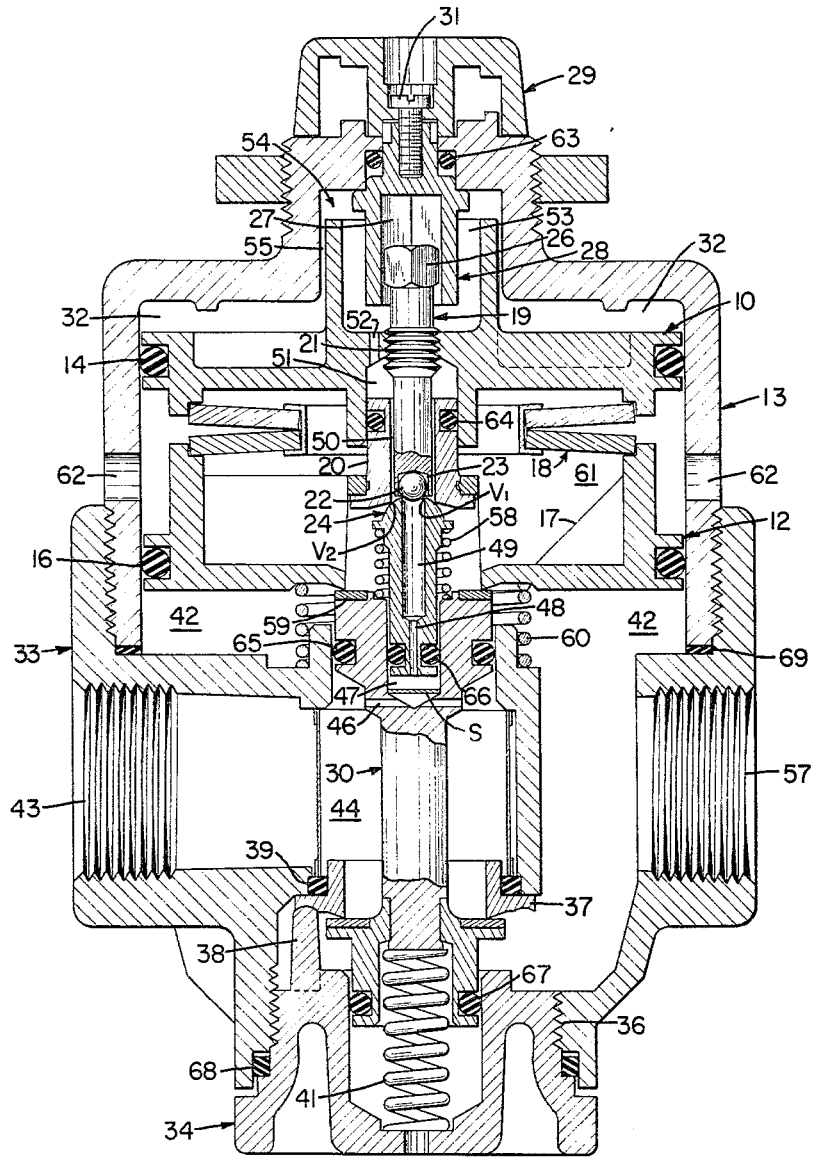

INVENTOR.
JOHN VANDER HORST

United States Patent Office 3,240,223
Patented Mar. 15, 1966

3,240,223
FLUID PRESSURE REGULATOR
John Vander Horst, Denver, Colo., assignor to C. A. Norgren Co., Englewood, Colo., a corporation of Colorado
Filed Aug. 2, 1963, Ser. No. 299,584
18 Claims. (Cl. 137—116.5)

This invention relates to a fluid pressure control and regulating device, and particularly to such a device having substantially linear regulation characteristics for variable flow requirements together with improved relief, flow and mechanical characteristics. By the term "linear" is meant minimum change in controlled or secondary pressure regardless of rate, direction, or primary pressure of the fluid flow.

The conventional type of regulator, employing a spring or pneumatically operated diaphragm for fluid pressure regulation, suffers from many disadvantages. In order to obtain a good, linear regulation curve for variable flow requirements, as well as good flow characteristics through several ports of the regulating device, it is necessary to use an extremely long, low rate, control spring in the conventional type of regulator frequently in conjunction with a siphon arrangement cooperating with the outlet port. Also, such conventional type regulators do not include full flow relief valves, and the relief valve operation is dependent upon the control spring rate. Prior art regulators often are bulky and difficult to adjust, especially through the high pressure portion of the pressure operating range. Several such different control springs are necessary to cover a complete pressure operating range. Still further, such prior art regulators are difficult to disassemble for servicing, as well as adapting for panel mounting, these operations involving the use of wrenches and the removal of the regulator from the line, or lines, being regulated. Prior art regulators also generally employ a constant bleed, which is wasteful, noisy and a source of operating failures.

Accordingly, one of the primary objects of this invention is to provide a fluid pressure regulating device having substantially linear regulation characteristics for variable flow requirements.

A further object is to provide in apparatus of the type described a completely balanced control mechanism which is independent of the rate of a control spring and/or any siphon arrangement.

It also is an object of this invention to provide a regulator having substantially linear relief flow characteristics.

Yet another object of this invention is to provide a pressure regulator including a full flow relief valve wherein the area of the relief valve is approximately equivalent to the area of the main valve.

It is also an object of this invention to provide such a fluid pressure regulating device having full flow capability from each of its several body ports without sacrifice of performance.

Still another object of this invention is to provide a fluid pressure regulator characterized by fingertip ease of adjustment throughout its pressure operating range and wherein a very light torque on the control knob thereof is sufficient for adjustment.

A further object of this invention is to provide a pressure regulator capable of operating over an extended fluid pressure range, with uniform performance, and without the necessity of using several, different control springs.

An additional object is to provide such a regulator which will, without utilizing a constant bleed, give superior performance to prior art piloted regulators of comparable size.

The above and other objects of the invention will become more apparent from the following detailed description of the invention, which is given primarily for purposes of illustration, and not limitation.

Stated in general terms, the objects of this invention are attained by providing a fluid pressure regulator which includes, in its regulating mechanism, two opposed, floating or movable members, such as piston elements, which work against a resilient separating element on the one hand and fluid force on the other hand, urging the two members in a manner to achieve a completely balanced control mechanism, the operation of which is independent of the rate of the resilient separating element. As a result of this balanced control mechanism and the unique pilot control means coacting therewith, a pressure regulator, which is much more compact than prior art regulators and which accomplishes the foregoing objects, is achieved and it exhibits superior flow control characteristics over those of the more bulky conventional types of regulators.

Figure 2:
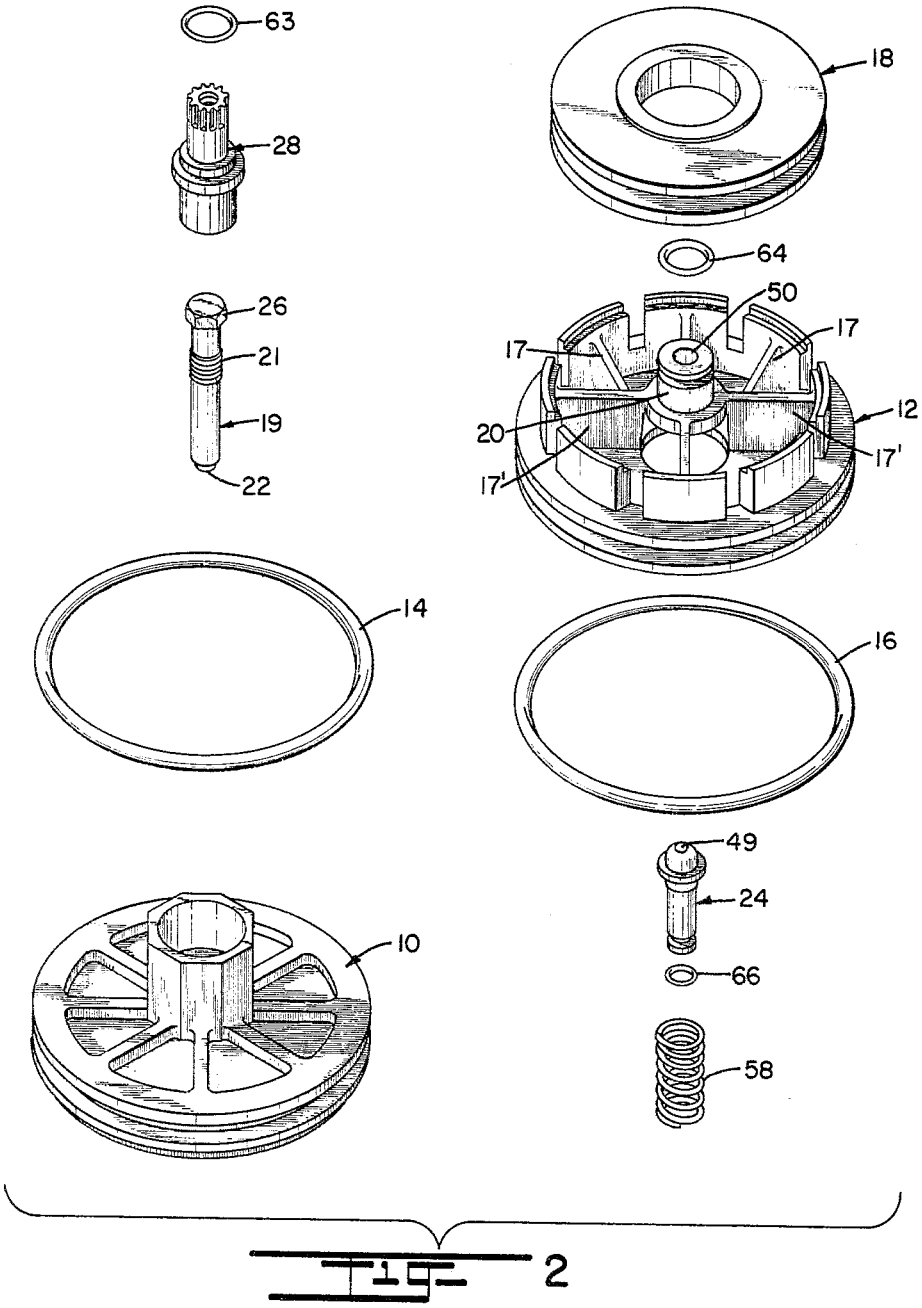

A specific embodiment of the invention is given below with reference to the appended drawings wherein like numerals represent similar elements throughout and wherein:

FIGURE 1 is a vertical, sectional elevational view of an embodiment of the invention showing the assembled fluid pressure regulator; and FIGURE 2 is a partial, exploded view showing some of the parts of the fluid pressure regulator of FIGURE 1.

Referring more particularly to the drawings, the balanced control mechanism includes an upper piston 10 and a lower piston 12, both being generally circular in shape, contained in a generally cylindrical regulator bonnet 13 with the interior side wall thereof functioning as a cylinder or main chamber for the pistons. Reference throughout the specification will be made to the word "piston" but the invention is by no means so limited and is intended to include a movable member generally such as a diaphragm. Upper piston 10 and lower piston 12 are positioned for movement vertically up and down in bonnet 13 with a circumferential seal provided by seal ring 14 mounted in the upper piston and seal ring 16 mounted in the lower piston, said seal rings riding on the said interior side wall. It will be noted that the section of lower piston 12, shown in FIGURE 1, is taken along a vertical plane passed between a pair of spaced ribs 17', shown on piston 12 in FIGURE 2 which provides a more apparent showing of the structural arrangement of piston 12 including the strengthening gussets 17. The resilient separating element 18, separating the two opposed pistons 10 and 12, is a Belleville washer unit, which functions as the control spring, such being located between pistons 10 and 12 and supported, in position, by their coaction. Here again it is to be understood that the element 18 shown is preferred but the invention is by no means limited to this particular type.

The adjusting screw 19 is mechanically connected to upper piston 10 by meshed left hand screw threads 21. A ball 22 inserted, in crimped fashion, in the lower end of adjusting screw 19, in a recess 23 formed in the lower extremity thereof, serves as the seat for the head of an upwardly biased member 24 to form what will be hereinafter referred to as a pilot valve $V_1$ to permit, as will become apparent, fluid to enter pilot control chamber 32. A hexagonal head 26 formed on the upper end of adjusting screw 19 engages in a female hexagonal recess 27 formed in the shank member 28, connected to the adjusting knob 29 by bolt 31 threaded into the shank member. The head 26 of the adjusting screw 19 is thus not confined in a vertical direction, but its radial position is entirely dependent upon the rotational position of adjusting knob 29 in view of the structure described. The pilot relief valve $V_2$ is provided, as will become apparent, to relieve excessive fluid pressure from the pilot control chamber 32, when warranted. The lower piston 12 includes an upstanding portion 20 that is hollow as at 50 to receive in spaced relationship part of the downward protrusion of screw 19 and is adapted to cooperate at its lower end with the head of member 24 to form said pilot relief valve $V_2$. Pilot valve $V_1$ and pilot relief valve $V_2$ combine to form pilot control valve means for pilot control chamber 32 and the unpressurized area 61 between pistons 10 and 12. It will be noted that ball 22 is arranged to transmit, upon certain conditions occurring, a downward force on member 24 to open valve $V_2$.

The main valve assembly 30 which is located in the regulator body 33, below the control mechanism, is designed to be completely removable from the pressure regulator. Removal is accomplished by unscrewing the bottom plug 34 from the regulator body 33, via meshed threads 36 and the member 24 of the pilot control valve means $V_1$ and $V_2$ is removable from the main valve assembly 30. The main valve seat 37 is separate and removable from regulator body 33 and when installed, main valve seat 37 is retained in position by upstanding lugs 38 formed on bottom plug 34. As apparent from FIGURE 1, a rubber washer 39 serves as a seal ring between main valve seat 37 and regulator body 33. The main valve assembly 30 is made of semibalanced construction by making a slightly larger area at the top end of the assembly than the actual area adjacent seat 37 with the area unbalance being in the direction of closing the main valve at seat 37. There is provided main valve spring 41 which also assists in insuring positive closing of the main valve.

To complete the numerical identification of the elements of the present invention, numeral 43 represents an inlet port, suitably threaded for connection with a primary air source, and communicating with main valve chamber 44. The latter in turn is adapted to communicate with pilot control chamber 32, assuming valve $V_1$ is open, through a plurality of passageways 46 to 55, inclusive, and primary air so flowing is filtered by suitable means S. An outlet port 57, also threaded for receiving a connection or fitting from the regulator, communicates with secondary chamber 42. Numeral 58 represents the spring for upwardly biasing member 24 whose head is common to both valves $V_1$ and $V_2$ while numeral 59 represents the main relief valve formed at the junction of the main valve assembly 30 and the piston 12, it being noted that the main relief valve 59 and main valve 37 are substantially equal in area. A follower spring 60 (its rate has no performance in the regulator) is provided for lower piston 12 and the area 61 between pistons 10 and 12 is unpressurized due to its communication with atmosphere through ports 62 in bonnet 13. The fluid pressure regulator throughout is provided with seal rings or gaskets 63 to 68, inclusive, as is the connection between bonnet 13 and body 33, as at 69, all for sealing purposes.

The principal control feature of the pressure regulator of this invention is the distance between upper piston 10 and lower piston 12 when the regulator is in a stabilized condition. This distance is initially determined by setting adjusting screw 19 and achieving the desired controlled pressure. Once the initial setting is made, the distance between pistons 10 and 12, which is determined by the length of protrusion of adjusting screw 19 below the upper piston 10, will always return to the preset distance following any disturbance in the pressure of the fluid being controlled and hence the compression on control spring 18 will always return to set value when the stabilized condition is reached. In other words, the compression of the control spring 18 set by adjustment screw 19 is constant when the regulator is in a stabilized condition and thus in reality, separating element 18 is a constant force spring. This in turn determines an equilibrium setting for the pilot valve control means including valves $V_1$ and $V_2$. Any pressure disturbance will cause either the pilot valve $V_1$ to open admitting a supply of additional primary pressure to the control chamber 32 or the pilot relief valve $V_2$ to open thus decreasing pressure in chamber 32 due to unpressurized area 42 being exposed to atmosphere.

To repeat, when the preset distance between pistons 10 and 12 returns to set value, the control spring, or Belleville washer unit 18, between the two pistons, will at all times be subjected to the same force of compression, and thus a constant separating force will be exerted against the pistons. The principal forces acting upon upper piston 10 are the pilot control pressure, acting through pilot control chamber 32, over the top area of the upper piston, resulting in a downward force; and the control spring action of the Belleville washer unit 18, producing an upward force upon the upper piston. The upward force acting upon the lower piston 12 is produced by the controlled pressure acting through secondary chamber 42 over the bottom area of the lower piston, and the downward force is that of the control spring action of element 18.

It will be seen that a very close area-pressure balance is maintained at all times throughout the entire system of the fluid pressure regulator of the invention. The principle acting forces of the regulator system are at all times due to the pilot pressure in chamber 32 and the controlled pressure in chamber 42 acting upon upper piston 10 and lower piston 12, respectively, and the opposing force due to the compressive action upon control spring unit 18. As stated hereinabove, the preset distance between upper piston 10 and lower piston 12 remains constant when the regulator is in a stabilized condition, and therefore the force exerted by control spring unit 18 must remain constant when the regulator is in a stabilized condition. The net result is that the output of the presure regulator is independent of the control spring rate after a given setting and, therefore, the flow characteristics of the regulator approach substantial linearity.

In operation, the primary fluid being controlled enters the pressure regulator through inlet port 43 and fills the main valve chamber 44. Main valve chamber 44 communicates with pilot control chamber 32 through the series of passageways 46 to 55, assuming valve $V_1$ is open. Pilot valve $V_1$ permits the pressure in pilot control chamber 32 to increase until the pilot pressure in chamber 32, acting upon the upper piston 10, causes the piston to move downwardly, and thus close pilot valve $V_1$. Adjusting screw 19, which carries pilot valve ball, or seat, 22 is connected to upper piston 10 as explained.

When the main valve 37 is opened, fluid enters the secondary chamber 42 and leaves the pressure regulator through one or more outlet ports 57. To open the main valve 37, it is necessary to load the control spring unit 18. The adjusting knob 29 is rotated in a clockwise direction and this rotation retracts the adjusting screw 19 in relation to upper piston 10. This retraction opens valve $V_1$ with the result that the pressure in pilot control chamber 32 increases, and upper piston 10 is then moved downwardly. As piston 10 moves downwardly, control spring unit 18 is loaded, and a downward force is exerted on lower piston 12. This downward force, in turn, is transmitted to the main valve assembly 30 through the area forming the main relief valve 59 and at this time valve 37 opens, and pressure is induced in secondary, or controlled pressure, chamber 42. The resulting controlled pressure in chamber 42 acts over the bottom area of lower piston 12 and in conjunction with pilot control pressure in chamber 32 forces both pistons 10 and 12 toward each other, and thus compresses control spring unit 18. When the set distance between piston 10 and 12 is reached, pilot valve $V_1$ closes, and no further pressure is induced in pilot control chamber 32. As will become apparent, if too much pressure enters chamber 32, pilot relief valve $V_2$ opens to relieve same to atmosphere and thus pressure in chamber 32 is controlled by pilot valve control means including valves $V_1$ and $V_2$.

At this point, the entire regulator mechanism, including main valve assembly 30 and the piston and control spring assembly 10, 12, 18 moves upwardly until a balanced condition is achieved, and the main valve 37 closes. In this balanced condition, a desired, controlled pressure has been obtained in chamber 42. The three major forces acting at this point, to keep the system in balance, are (1) that of the secondary, or controlled, pressure acting upwardly in chamber 42 on lower piston 12; (2) that of the pilot pressure acting downwardly in chamber 32 on upper piston 10, and (3) that of the pressure due to compression of control spring unit 18, which is equal and opposite to the sum of the other two forces.

In this equilibrium state, these three forces act as three springs in series. A variation in one of the forces causes an immediate reaction in the other two forces, as the system seeks a new equilibrium state, or position. For example, consider the change produced in these three equilibrium forces when a valve is opened downstream from the fluid pressure regulator, thus creating a flow demand upon the regulator. The pressure in the secondary, or controlled, chamber 42 immediately drops, thus causing a sudden reduction in the upward force of lower piston 12. As a result of this drop, the energy in the control spring unit 18 forces pistons 10 and 12 apart, and at the same time, the pressure in the pilot control chamber 32 forces the entire mechanism 30, 10, 12, and 18 downwardly.

This downward movement of the entire mechanism produces the following reactions. The downward motion of the piston assembly 10, 12 and 18 opens main valve 37. The opening of main valve 37 permits secondary, or controlled, pressure to increase to its original value, in chamber 42, before the opening of a downstream valve in a line controlling the operation, for example, of a tool operated by fluid pressure from the source. Downward motion of upper piston 10 increases the volume of pilot control chamber 32, which momentarily decreases the pilot pressure. Separation of pistons 10 and 12 opens pilot valve $V_1$. The pilot pressure in pilot control chamber 32 increases to its original value, prior to opening of the downstream valve, but in a larger volume. Control spring unit 18 is compressed to its original, preset distance, as determined by the setting of adjusting screw 19. The final result of these reactions is the establishment of a new equilibrium state for the pressure regulator, with the main valve 37 opened, to meet the flow demand created by opening a valve downstream from the regulator.

With the system in this newly established equilibrium state, having main valve 37 open, consider the converse effect of a sudden secondary, or controlled, pressure increase downstream from the regulator, such as that caused by suddenly closing a downstream valve. The increased secondary, or controlled, pressure in chamber 42 causes lower piston 12 to move upwardly. The upward motion of lower piston 12 forces pistons 10 and 12 closer together, which additionally compresses control spring unit 18. The decrease in distance between pistons 10 and 12 causes pilot relief valve $V_2$ to open, which permits pressure to escape from pilot control chamber 32 to the atmospheric chamber 61 between pistons 10 and 12. Upward motion of lower piston 12 opens main relief valve 59, thus permitting excess secondary, or controlled, pressure to escape to the atmosphere through a series of holes 62 in bonnet 13. Again the pressure regulator system reaches an equilibrium state with the original secondary and pilot pressures and the original control spring compression.

Thus main valve 37 will be opened, or closed, depending upon the flow demand placed upon the pressure regulator. As pointed out hereinabove, the secondary, or controlled, pressure depends upon the distance between the two pistons 10 and 12. It will be seen that when the distance between pistons 10 and 12 is relatively short, relatively large secondary and pilot pressures are required to compress the control spring unit 18, and close the pilot valve $V_1$. When the distance between pistons 10 and 12 is relatively great, relatively smaller pressures are required to close pilot valve $V_1$. The distance between pistons 10 and 12 is, in turn, determined by the distance that adjusting screw 19 protrudes below upper piston 10. The balanced main valve 37 permits the maintenance of a stable secondary, or controlled, pressure regardless of variations in the primary pressure.

Among the advantages attained by the use of the fluid pressure regulator of this invention are a completely balanced control mechanism which is independent of the rate of a control spring, substantially linear regulation characteristics for variable flow requirements, substantially linear relief flow characteristics, a full flow relief valve wherein the area of the relief valve is about equivalent to the area of the main valve, full flow capability from each of the several ports of the regulator body without sacrifice of performance, finger tip ease of adjustment throughout the entire pressure operating range, ease of panel mounting of the regulator by the use of a small control knob which does not elevate or lower its position relative to the regulator body when being rotated, the use of a single control spring for operation over an extended fluid pressure operating range with uniform performance characteristics, the elimination of the use of a constant bleed together with all of its disadvantages, ease of disassembly including ease of removal of the entire operating mechanism of the regulator for servicing or cleaning without the use of wrenches or without removal of the regulator from the line and compactness and light weight characteristics.

It will be understood that many modifications and variations can be made in the structure, construction and materials used in the fluid pressure regulator of the invention described above. For example, instead of the use of a Belleville washer unit 18 as the control spring, other resilient members, such as a large spiral spring, a plurality of spiral springs, resilient elastomers or rubber rings, etc., can be used as the control spring. Obviously, many other modifications and variations of the present invention are possible in the light of the teachings given hereinabove, such as the use of different removable members 10 and 12. It is, therefore, to be understood that within the scope of the appended claims, the invention can be practiced otherwise than as specifically described. Further, as used herein with reference to the element 18, the term "constant" refers to any equilibrium or stabilized condition which the regulator mechanism will assume following any disturbance. Also, heretofore in the specification reference has been made occasionally to "air" but it is clear that the invention is applicable with reference to a "fluid" generally which would include air, gaseous mediums and liquid.

What is claimed is:

1. A fluid pressure regulator providing a required outlet pressure comprising: a casing having a flow passage therethrough with inlet and outlet; a main valve controlling the flow of fluid through said flow passage; a main chamber in said casing; at least two reciprocably movable elements mounted in said main chamber in opposed relationship and in operative relationship with said main valve, the exposed surface of one movable element forming a movable wall of a pilot control pressure chamber and the exposed surface of the other movable element forming a movable wall of a controlled pressure chamber; biasing means resiliently biasing said movable elements apart; a passageway for inlet fluid to said pilot control pressure chamber; pilot control valve means in said passageway; and control means movable with said one movable element and cooperating with said pilot control valve means for controlling the flow of fluid in said passageway and thereby the pressure in said pilot control pressure chamber and the loading of said biasing means.

2. The fluid pressure regulator of claim 1 in which said pilot control valve means includes a valve element and a seat element therefor and said control means carries one of said elements of said pilot control valve means.

3. The fluid pressure regulator of claim 1 in which said control means is adjustable and said reciprocably movable elements are pistons.

4. A fluid pressure regulator providing a required outlet pressure comprising: a casing having a flow passage therethrough with inlet and outlet; a main valve controlling the flow of fluid through said flow passage; a piston chamber in said casing; two reciprocably movable pistons mounted in said piston chamber in opposed relationship and in operative relationship with said main valve, the exposed surface of one piston forming a movable wall of a pilot control pressure chamber and the exposed surface of the other piston forming a movable wall of a controlled pressure chamber; biasing means resiliently biasing said pistons apart in all operative positions thereof; a passageway for inlet fluid to said pilot control pressure chamber; pilot control valve means in said passageway; and control means movable with said one piston and cooperating with said pilot control valve means for controlling the flow of fluid in said passageway and thereby the pressure in said pilot control pressure chamber and the loading of said biasing means.

5. A fluid pressure regulator providing a required outlet pressure comprising: a casing having a flow passage therethrough with inlet and outlet; a main valve controlling the flow of fluid through said flow passage; a piston chamber in said casing; two reciprocably movable pistons mounted in said piston chamber in opposed relationship and in operative relationship with said main valve, the exposed surface of one piston forming a movable wall of a pilot control pressure chamber and the exposed surface of the other piston forming a movable wall of a controlled pressure chamber; biasing means resiliently biasing said pistons apart in all operative positions thereof; a passageway for inlet fluid to said pilot control pressure chamber; second valve means in said passageway control means movable with said one piston and cooperating with said second valve means for controlling the flow of fluid in said passageway and thereby the loading of said biasing means; third valve means for venting excess fluid pressure from said pilot control pressure chamber; and a fourth valve means for venting excess pressure from said controlled pressure chamber.

6. The fluid flow regulator of claim 5 in which said control means also cooperates with said third valve means to control the flow of fluid therethrough.

7. A fluid flow regulator operative to control outlet fluid pressure, comprising: in combination, a valve housing forming a fluid flow passageway and a piston chamber; a main valve in said flow passageway including a first valve piston and a first valve seat near one end of said first valve piston; a second valve seat on the other end of said first valve piston; a first piston member reciprocably mounted in said piston chamber with its outer surface in communication with outlet fluid pressure in said flow passageway and adapted to contact said second valve seat to form a second valve for venting outlet fluid pressure to the atmosphere and to reciprocably move said first valve piston; a second piston member reciprocably mounted in said piston chamber in opposed relationship with said first piston member with its outer surface constituting a movable wall of a reference pressure valve chamber; biasing means between the inner surfaces of said piston members resiliently biasing them apart in all operative positions thereof; an inlet passage for ducting inlet fluid pressure to said valve chamber; a cylindrical, resiliently biased movable valve element carried at said other end of said first valve piston and defining one section of said inlet passageway; a cylindrical second valve piston attached to said first piston member defining in closed position another section of said inlet passageway and adapted to seat on the free end of said movable valve element with its internal periphery surrounding the outlet end of said one section of the inlet passageway and forming with said movable valve element a valve for venting excess pressure in said valve chamber; a control element attached to said second piston having a ball valve element on its free end and mounted for the ball valve element to seat on said free end of the movable valve element for valving the outlet of said one section of the inlet passageway.

8. The fluid flow regulator of claim 7 in which said control element is adjustably attached to said second piston member.

9. A fluid pressure regulator device for maintaining a predetermined outlet pressure which comprises: a fluid pressure regulator body; a main valve mechanism mounted in said body to control the passage of fluid therethrough; and a fluid pressure regulator mechanism mounted inside said fluid pressure regulator body in operative relationship with said main valve mechanism for controlling outlet fluid pressure; said fluid pressure regulator mechanism comprising: a chamber, two opposed piston means mounted in said chamber, the outer surface of one piston means forming a movable wall of a pilot control pressure chamber and the outer surface of the other piston means forming a movable wall of a controlled pressure chamber; biasing means between said piston means resiliently biasing them apart; a passageway for inlet fluid pressure to said pilot control pressure chamber; pilot valve control means in said passageway for controlling the pressure in said pilot control pressure chamber; adjusting means movable with said one piston means and cooperating with said pilot valve control means for controlling the flow of fluid in said passageway and thereby the pressure in said pilot control pressure chamber, and the loading of said biasing means.

10. A fluid pressure regulator device for maintaining a predetermined outlet pressure which comprises: a fluid pressure regulator body; a main valve mechanism mounted in said body to control the passage of fluid therethrough; and a fluid pressure regulator mechanism mounted inside said fluid pressure regulator body in operative relationship with said main valve mechanism for controlling outlet fluid pressure; said fluid pressure regulator mechanism comprising: a chamber; two opposed piston means mounted in said chamber, the outer surface of one piston means forming a movable wall of a first valve chamber for reference fluid pressure and the outer surface of the other piston means forming a movable wall of a second valve chamber for controlled outlet fluid pressure; biasing means between said piston means resiliently biasing them apart; said body including a passageway for inlet fluid pressure to said first valve chamber; pilot valve control means associated with said passageway for alternatively venting excess pressure in said reference pressure chamber to the atmosphere, and for venting inlet pressure to said reference pressure chamber; and control means movable with said one piston cooperating with said pilot valve control means for venting said excess pressure to the atmosphere and said inlet pressure to said reference pressure chamber.

11. Apparatus of claim 10 wherein there is provided a main pressure relief valve in said body associated with said second valve chamber for relieving pressure therein to the atmosphere.

12. Apparatus of claim 11 in which said main pressure relief valve has an effective area substantially equal to that of the main valve.

13. A fluid pressure regulator device for maintaining a predetermined outlet pressure which comprises: a fluid pressure regulator body; a main valve mechanism mounted in said body to control the passage of fluid therethrough; and a fluid pressure regulator mechanism mounted inside said fluid pressure regulator body in operative relationship with said main valve mechanism for controlling outlet fluid pressure; said fluid pressure regulator mechanism comprising: a piston chamber; two opposed piston means mounted in said piston chamber, the outer surface of one piston means forming a movable wall of a first valve chamber for reference pilot pressure and the outer surface of the other piston means forming a movable wall of a second valve chamber for controlled outlet fluid pressure; biasing means resiliently biasing said piston means apart; said body including a passageway for inlet fluid pressure to said first valve chamber; pilot pressure control valve means associated with said passageway operative upon relative movement between said piston means to alternatively vent excess pressure from said first valve chamber to the atmosphere and inlet pressure to said first valve chamber; and control means movable with said one piston operatively cooperating with said pilot pressure control valve means for the operation thereof and operative to control the distance of relative movement between said pistons required for the venting operation of said pilot pressure control valve means; whereby said opposed piston means, biasing means, control means, and pilot pressure control valve means are operatively associated to move together to operate said main valve mechanism to maintain a predetermined outlet pressure and relative movement between said piston means and the consequent venting action stabilizes the operation of the regulator device to provide increased linearity.

14. A fluid pressure regulator providing a required outlet pressure comprising: a casing having a flow passage therethrough with inlet and outlet; a main valve controlling the flow of fluid through said flow passage; a piston chamber in said casing; at least two reciprocably movable piston means mounted in said piston chamber in opposed relationship and in operative relationship with said main valve, the outer surface of one piston means forming a movable wall of a first chamber exposed to pilot control pressure and the outer surface of the other piston means forming a movable wall of a second chamber exposed to outlet fluid pressure; biasing means resiliently biasing said piston means apart in all operative positions thereof; a passageway for inlet fluid to said first chamber; and preset pilot control valve means associated with said passageway operative solely in response to relative movement between said piston means to control the pressure in said first chamber.

15. The regulator of claim 14 in which said control valve means controls the pressure in said first chamber by alternatively venting excess pressure in said first chamber to the atmosphere and inlet pressure to said first chamber.

16. A fluid pressure regulator providing a required outlet pressure comprising: a casing having a flow passage therethrough with inlet and outlet; a main valve controlling the flow of fluid through said flow passage; a piston chamber in said casing; at least two reciprocably movable piston means mounted in said piston chamber in opposed relationship in operative relationship with said main valve, the outer surface of one piston means forming a movable wall of a first chamber exposed to pilot control pressure and the outer surface of the other piston means forming a movable wall of a second chamber exposed to outlet fluid pressure; biasing means resiliently biasing said piston means apart; a passageway for inlet fluid to said first valve chamber; and control valve means associated with said passageway including a first valve element carried by said one piston means, a second valve element carried by said other piston means and a third valve element operated by said first and second valve elements, said valve elements responsive to relative movement between said piston means to effect the valving operation of said control valve means in said passageway, whereby relative movement between said piston means controls said valving operation and thereby the pressure in said first valve chamber.

17. A fluid pressure regulator providing a required outlet pressure comprising a casing having a flow passage therethrough with inlet and outlet; a main valve controlling the flow of fluid through said flow passage; a piston chamber in said casing; at least two reciprocably movable piston means mounted in said piston chamber in opposed relationship and in operative relationship with said main valve, the outer surface of one piston means forming a movable wall of a first chamber exposed to pilot control pressure and the outer surface of the other piston means forming a movable wall of a second chamber exposed to outlet fluid pressure; biasing means resiliently biasing said piston means apart in all operative positions thereof; a passageway for inlet fluid to said first chamber; and preset pilot control means operative in response to relative movement between said piston means to control the pressure in said first chamber, said pilot control valve means including a pilot valve and a pilot relief valve alternately operable to vent excess control pressure in the first chamber to atmosphere and inlet pressure to said first chamber.

18. The regulator of claim 17 wherein one of the valve portions of the pilot valve is movable with one of the pistons during all movements thereof and one of the valve portions of the pilot relief valve is movable with the other piston during all movements thereof.

References Cited by the Examiner

UNITED STATES PATENTS

| 941,153 | 11/1909 | Krichbaum | 137—505.18 |
| 2,884,003 | 4/1959 | Jensen | 137—495 |
| 2,888,027 | 5/1959 | Gerwig et al. | 137—116.5 |

MARTIN P. SCHWADRON, *Acting Primary Examiner.*

M. CARY NELSON, *Examiner.*